Patented Oct. 12, 1948

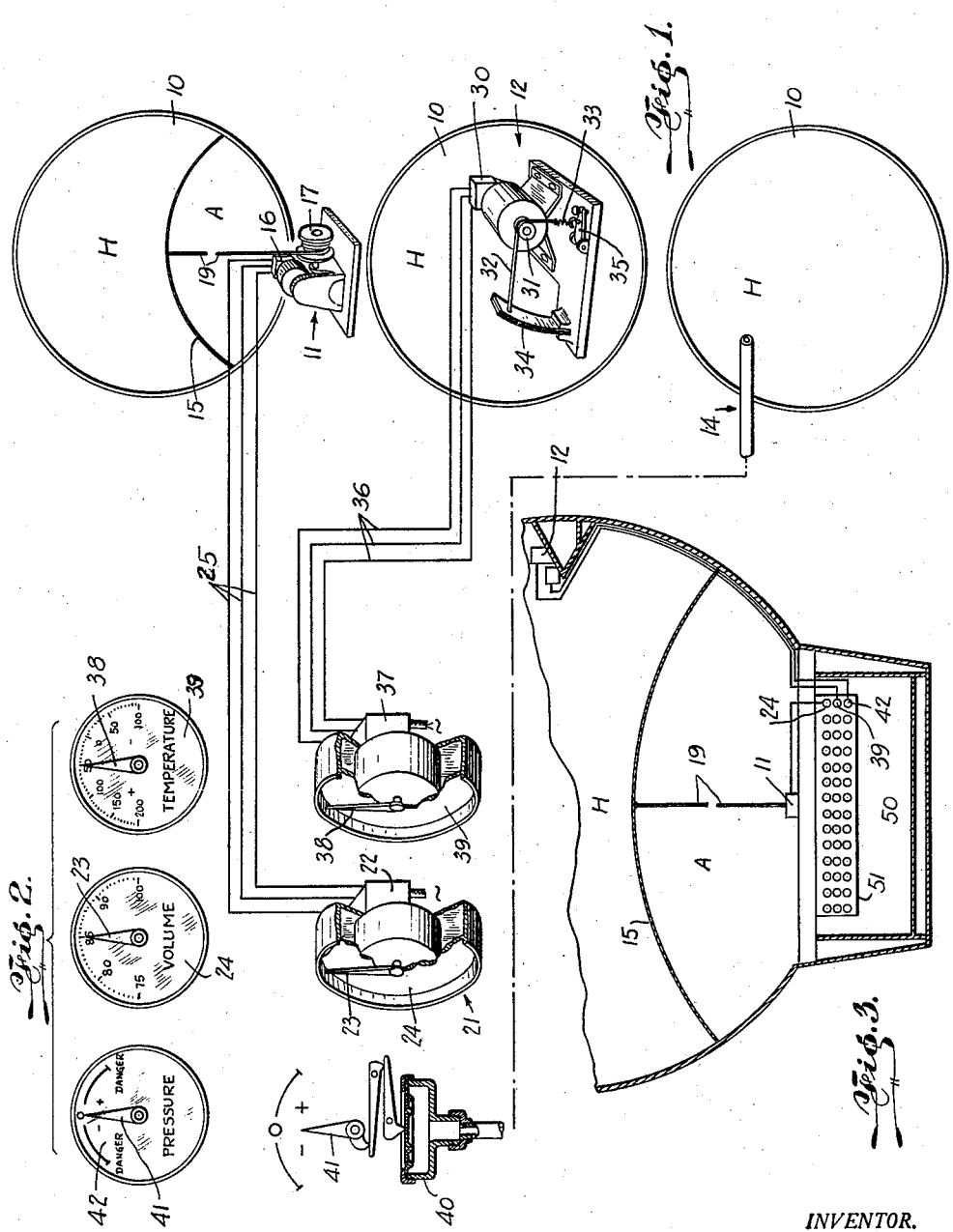

2,450,954

UNITED STATES PATENT OFFICE 2,450,954

MEANS FOR INDICATING THE STATE OF GAS
IN CELLS OF AIRCRAFT

Charles S. Hall, New York, N. Y.

Application September 4, 1945, Serial No. 614,314

4 Claims. (Cl. 244—97)

This invention relates to lighter-than-air craft and deals more particularly with means for determining the state or condition of the gas used for providing such craft with air buoyancy.

The type of craft particularly adapted for the present invention is the skin stressed metal type using helium as it buoyancy medium. This lighter-than-air gas is highly susceptible to pressure and temperature changes and its buoyancy attributes change considerably under varying conditions of pressure and temperature. As can be well understood, considerable change in both pressure and temperature in an airship, may take place at, for instance, 5,000 to 6,000 feet elevation over what it had been at sea level and the flight officer of such a ship, in order to fly and maneuver such a ship in a proper manner, would need prompt and reliable data as to the condition of the buoyancy medium in the cells or bays of the ship.

Accordingly, the primary object of this invention is to provide means for indicating the state or condition of the gas in the cells of a lighter-than-air craft.

Another object is to provide means for promptly indicating the state or condition of the gas in the cells of a lighter-than-air craft.

A further object is to provide means for simultaneously indicating the pressure, volume and temperature of the gas in the cells of a lighter-than-air craft.

With the foregoing and other objects in mind, the purposes and the advantages of the invention may be more fully understood from the following description which is based on the accompanying drawing, and in which:

Fig. 1 is a diagrammatic view illustratng the instrumentalities of the invention.

Fig. 2 is a view illustrating the faces of the indicating instruments employed in the invention.

Fig. 3 is a partial cross-sectional view of an airship showing the manner in which the invention is applied thereto and also showing a preferred indicator panel board.

For a clearer understanding of the invention, it may first be stated that lighter-than-air craft such as the skin stressed metal type are constructed to provide a plurality of individually sealed gas-containing cells and that the gas in these cells each react differently to variations in pressure and temperature. Both these attributes are related to the volume in each cell. It is, therefore, understood that whereas the following describes the means for indicating the change of state in one cell, as many indicating means as cells for volume, pressure and temperature may be employed.

Each cell 10, therefore, may be provided with a servo unit, such as the volume indication transmitting device 11; with a servo unit such as the temperature indicating transmitting device 12; and with a pressure transmitting tube 14.

Volume indication

Inasmuch as the volume of the gas or helium varies greatly at varying altitudes, air is employed to cushion and accommodate this change. To this end the craft is preferably provided, in each cell, with flexible means such as the diaphragm 15, the area H being filled with helium and the area A, with air which may be atmospheric or under positive pressure, as desired.

Since the servo unit 11 may be disposed in either the H or A area, it is preferable to place it in the A area for readier access. This unit may comprise an autosyn transmitting device 16, a reel 17, means 18 for mechanically transmitting the movement of the reel 17 to the rotating element of the autosyn device 16, and a line, cord or wire 19 wound on the reel and connected with the diaphragm 15.

At a point where such an instrument may be constantly observed, there is provided a volume indication receiving device 21 which essentially comprises an autosyn receiver 22 operating an indicator 23 associated with a dial 24. As seen in Fig. 2, the latter is preferably graduated from 75 to 100 as will be later explained.

The variation of volume in the gas cell is indicated in the following manner. When the diaphragm 15 is extended to the limit of minimum volume in the area H, the line 19 from the reel 17 will be moved to the full out position by the raised diaphragm. With the diaphragm and reel thus positioned, the autosyn transmitting unit 16 will conduct, over wires 25, electrical impulses of a certain value to the autosyn receiving unit 22 to cause the indicator 23 to aline with the legend "75" (or 75% volume) on the dial 24. Such a reading of the volume indicating means will apprise the proper officer to take the necessary steps to increase the volume of gas in the cell.

Conversely, with the diaphragm 15 fully extended in the full volume position, the reel 17 will take up all or most of the line 19 to move the rotor of the autosyn transmitter to a position where electrical impulses of different value will be carried by conductors 25 to the autosyn receiving unit 22. This will cause movement of the indicator 23 to a different point of the dial 24, said point, in this case, being "100" to indicate maximum or 100% volume of gas in the cell.

It is understood, of course, that intermediate positions of the diaphragm 15 will cause commensurate indicator positions with respect to the dial 24 whereby the volume in each gas cell may be promptly determined.

Temperature indication

The temperature indicating transmitting device 12 may comprise an autosyn unit 30 having a rotor provided with a pulley or the like 31. Over this pulley may be trained means such as a wire 32 which is spring-tensioned at one end as by means of a spring 33 and is connected at the other end to thermostatic means such as a bi-metallic strip 34. Tension adjusting means 35 may also be provided.

It is evident that changes in temperature in the cell will cause the strip 34 to either seek to straighten or flex and that such movement of the strip will rotate the pulley 31 and thus cause the autosyn transmitter 30 to send electrical impulses of varying degree through conductors 36 to the autosyn receiver 37. It is apparent, also, that indicator 38, associated with the dial 39, will be moved as the autosyn receiver responds to the impulses received by it to indicate the temperature condition within the gas cell, unflexed or slightly flexed positions of the strip 34 indicating low or minimum temperatures and increased flexed positions, indicating high or maximum temperatures.

*Pressure indication*

The pressure indicating means comprises the pressure transmission tube 14 incorporated in each gas cell and connected with an aneroid indicator 40 which includes an index 41 associated with a dial 42. The manner of operation of this device should be apparent, the index 41 responding to changes in pressure in the cell to indicate such change on the dial 42.

The three dials showing pressure, volume and temperature may be arranged in the control room 50 of the aircraft so that they may be read connectively and also to indicate which of the various cells is in circuit with these dials. Thus, a fourteen cell craft would need fourteen sets of three dials each. A panel 51 provided with such an arrangement is shown in Fig. 3.

When it is borne in mind that the pressure, volume and temperature of the gas are interrelated properties and that a change in one will cause reaction in the other two, the importance of providing for simultaneous reading of the conditions will become evident. For instance, for all operating conditions between 75% and 100% volume, the pressure should approximate zero. A serious problem in the operation of lighter-than-air craft is the contraction and expansion of the gas in the cells. Raising the craft causes expansion of the gas, lowering it, contraction. Such changes may occur even in flight at one elevation and always affect the flying control of the craft. Enabling the flight officer to at all times read upon dials the condition of the gas in the various cells, provides for increased safety of the ship and crew as can be well understood.

The foregoing specification, while descriptive of a preferred form of the invention, is intended as exemplary, only, it being understood that variations within the scope of the invention as claimed may be made by those skilled in this art.

What I claim as new and desire to secure by Letters Patent, is:

1. In lighter-than-air craft, a gas-holding cell comprising an envelope having a curved peripheral wall, said wall being adapted to assume a circular shape under maximum pressure conditions in said cell and a portion of said wall being adapted to assume a reversely curved shape under less than maximum pressure conditions, and means for indicating the position of the mentioned wall portion and, consequently, the volume of the gas in the cell, said latter means comprising a volume indication transmitting unit associated with the cell, a volume indication receiving device operatively connected with the transmitting unit and remotely located with respect thereto, and means operatively connecting the mentioned wall portion and said volume indication transmitting unit comprising a reel on said unit and a line controlled by the reel and connected to a mid-point of said wall portion.

2. In lighter-than-air craft, a gas-holding cell comprising an envelope having a curved peripheral wall, a portion of said wall comprising a flexible diaphragm, and said diaphragm being adapted to assume a shape forming a continuation of said curved peripheral wall under maximum pressure conditions in the cell and to assume a reversely curved shape under less than maximum pressure conditions, means for indicating the position of said diaphragm and, consequently, the volume of the gas in the cell, said latter means comprising a volume indication transmitting unit associated with the cell, and a volume indication receiving device operatively connected with the transmitting unit and remotely located with respect thereto, and means operatively connecting the diaphragm and said volume indication transmitting unit comprising a reel on said unit and a line controlled by the reel and connected to a mid-point of said diaphragm.

3. In lighter-than-air craft, a plurality of gas-holding cells, each comprising an envelope having a wall portion which moves in the manner of a diaphragm, a gas temperature indicating transmitting device located in each cell, a gas pressure transmitting tube also located in each cell, a gas volume indication transmitting unit located outside each said cell and operatively connected with the mentioned wall portion, a temperature, a pressure and a volume indicator respectively operatively connected with said temperature indicating transmitting device, said gas pressure tube, and said volume indication transmitting device, and a common panel for the three indicators for each of the cells of the craft.

4. In lighter-than-air craft, a plurality of gas-holding cells, each comprising an envelope having a wall portion which moves in the manner of a diaphragm, a gas temperature indicating transmitting device located in each cell, a gas pressure transmitting tube also located in each cell, a gas volume indication transmitting unit located outside each said cell and operatively connected with the mentioned wall portion, a temperature, a pressure and a volume indicator respectively operatively connected with said temperature indicating transmitting device, said gas pressure tube, and said volume indication transmitting device, a panel supporting said indicator and said indicators being arranged in related banks on said panel for each cell of the craft.

CHARLES S. HALL.

REFERENCES CITED

The following references are of record in the file of this patent:

UNITED STATES PATENTS

| Number | Name | Date |
| --- | --- | --- |
| 1,245,389 | Schmidt | Nov. 6, 1917 |
| 1,496,416 | Honeywell | June 3, 1924 |
| 1,648,935 | Campau | Nov. 15, 1927 |
| 1,682,961 | Hall | Sept. 4, 1928 |
| 1,795,335 | Hall | Mar. 10, 1931 |